Figure 1:
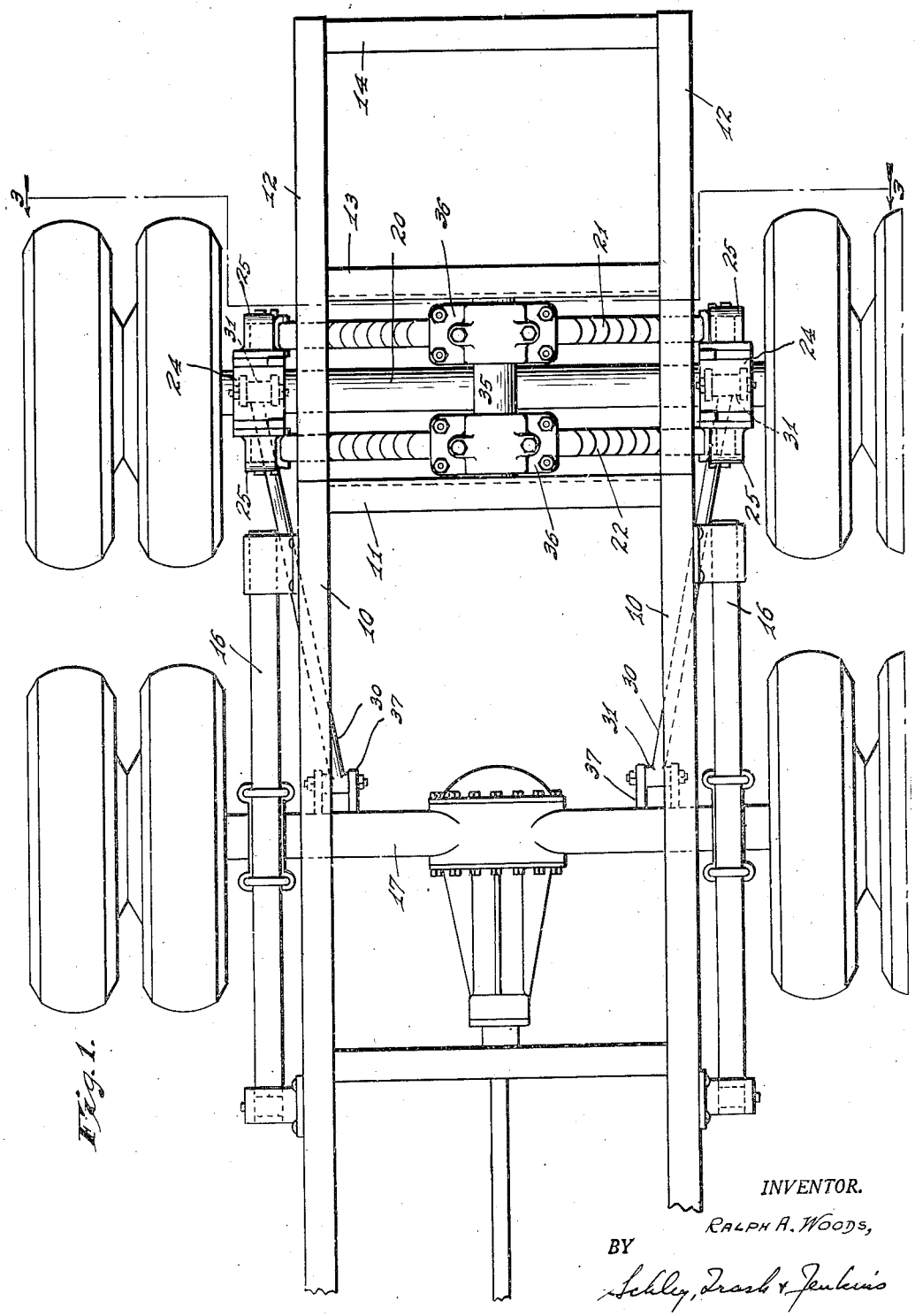

Jan. 11, 1949.  R. A. WOODS  2,458,816
TANDEM AXLE CONSTRUCTION FOR TRUCKS
Filed March 24, 1947  2 Sheets-Sheet 1

INVENTOR.
RALPH A. WOODS,
BY
Schley, Trask & Jenkins
ATTORNEYS.

Jan. 11, 1949.   R. A. WOODS   2,458,816
TANDEM AXLE CONSTRUCTION FOR TRUCKS
Filed March 24, 1947   2 Sheets-Sheet 2
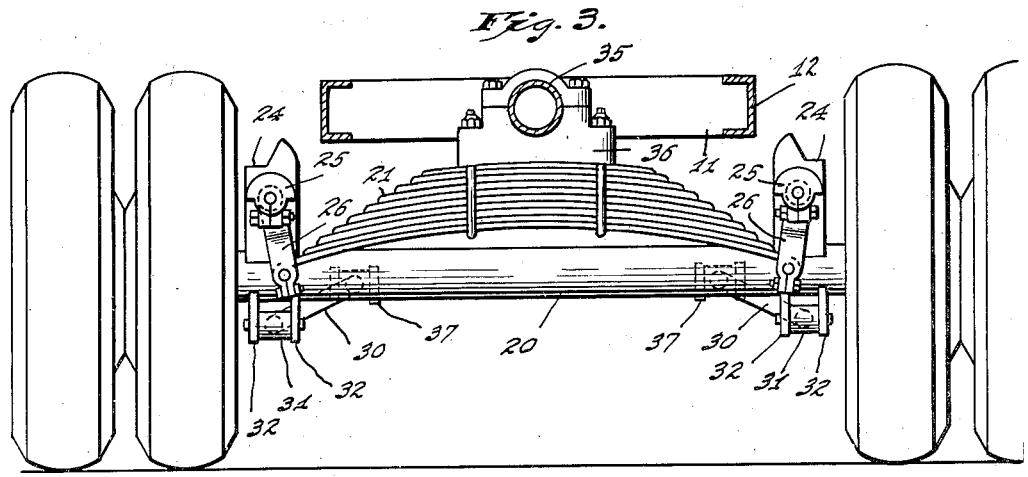
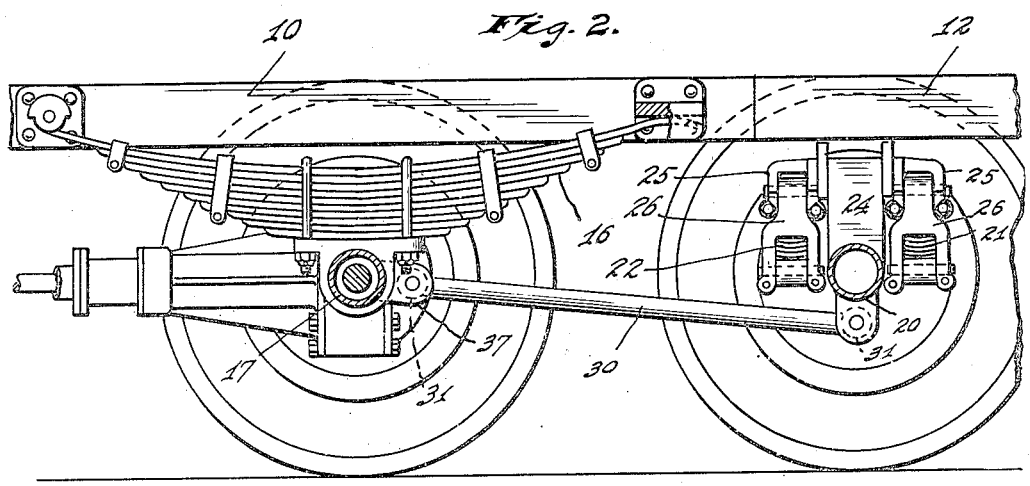
INVENTOR.
RALPH A. WOODS,
BY
ATTORNEYS.

Patented Jan. 11, 1949

2,458,816

UNITED STATES PATENT OFFICE 2,458,816

TANDEM AXLE CONSTRUCTION FOR TRUCKS

Ralph A. Woods, Morgantown, Ind.

Application March 24, 1947, Serial No. 736,837

4 Claims. (Cl. 280—124)

This invention relates to a tandem axle construction for trucks.

In tandem axle arrangements, if the two axles are held in relatively fixed position with respect to each other in horizontal plan, a severe tire scuffing occurs. Various schemes have been proposed to overcome this difficulty, as by providing mechanism to give the two axles a self-steering effect. Such mechanisms, however, have been relatively complicated and highly expensive, and in many cases are wholly unsuited for application to a truck of standard construction save by extensive changes from that standard construction.

It is the object of my invention to provide a tandem axle construction which will be simple and inexpensive, which may be applied to a truck substantially without modification of its standard construction and either as original equipment or as a modification thereof, which at the same time will give a self-steering effect to the tandem axle and will substantially avoid tire scuffing, and in which the tandem axle will give full load support yet will yieldingly float to proper position without undue stress upon the truck or its frame.

In accomplishing these objects, I provide a tandem axle which carries a pair of springs longitudinal with respect thereto, with the springs supported at opposite sides of the axles by means, such as long shackles, which permit free movement of the axle longitudinally with respect to the springs and transversely of the truck frame, connect the springs to the truck frame centrally, and interconnect the tandem axle to the standard axle of the truck by a pair of tie rods whose standard-axle ends are spaced closer together and desirably higher than their tandem-axle ends.

The freedom of transverse movement of the tandem axle will itself eliminate most tire scuffing, for in most cases it substantially prevents the tandem-axle tires from being dragged sideways as the truck negotiates a turn. In combination with such freedom of axle movement, the forward convergence of the tie rods effects a self-steering action of the tandem axle which tends to cause it to follow the truck axle during both turns and forward movement and to return it to trailing position after any displacement. Such self-steering action thus cooperates with the freedom of axle movement to produce in combination an effective prevention of tire scuffing in a simple and inexpensive tandem axle assembly.

The central connection of the transverse springs to the frame may be a pivotal connection, and desirably it is pivotal when the stabilizing effect of a rigid connection is dispensible, for this gives greater flexibility of movement as between the four wheels of the dual axle arrangement.

The ends of the two transverse springs are desirably supported at about, or slightly below, the level of the axis of the tandem axle, and the tie rods are desirably connected to such axle on a pivot axis spaced below the axis thereof, and extend forwardly with some upward inclination to points of attachment on the leading axle at about the level of its axis. By this arrangement the springs aid in positioning the axle with respect to the tie rods and introduce a desirable resilience into that positioning. In addition, the upward inclination of the tie rods causes a forward movement of the trailing axle as it drops and a rearward movement as it rises and tends to avoid shocks on both axles as their wheels encounter rises and repressions in the roadway.

The transverse springs of the tandem axle may be chosen with regard to the characteristics of the suspension of the axle with which the tandem axle is associated, and my invention gives full freedom of choice for such springs. When the tandem axle is a dead axle and is associated with a power axle, I preferably choose transverse springs of such size and characteristics that when the load is only that of the body and chassis, most of the load, for example up to 70 or 75%, is carried by the power axle and but a small portion carried by the tandem axle, and that under full truck load somewhat more than half, for example 60%, is carried by the power axle and the rest by the tandem axle.

My invention is not limited, however, to the combination of a dead tandem axle with a power axle, and the tandem axle may be powered; or a tandem dead-axle assembly may be associated with another dead axle, as for a semitrailer. In speaking of the application of my invention to a truck, I use "truck" broadly, to mean various load carrying vehicles including trailers and semitrailers.

The accompanying drawings illustrate my invention: Fig. 1 is a plan view of a truck chassis embodying my invention; Fig. 2 is a side elevation of the chassis shown in Fig. 1 with the wheels at the front side of the view removed; and Fig. 3 is a vertical transverse section on the line 3—3 of Fig. 1.

In the embodiment of my invention shown in the drawings, the truck chassis includes a frame 10 of standard construction, terminating at or closely behind the rear cross member 11. As will be desirable in many cases, the truck frame is here shown with a rearward extension, including longitudinal rails 12 and cross members 13 and 14. The standard frame 10 is supported in any usual way, here shown as by longitudinal springs 16 resting on a standard driving axle 17 in the common Hotchkiss drive arrangement. Such Hotchkiss drive is not essential, and other drive arrangements may be used.

The tandem axle assembly comprises the tandem axle 20 with wheels journaled on its ends, and a pair of transverse springs 21 and 22 extending parallel with and on opposite sides of the tandem axle 20. These springs are supported at about the level of the axis of the axle 20 by means which permits the axle 20 to freely move longitudinally of itself with respect to the springs. Desirably, for this spring support, the axle 20 is provided near its ends with upstanding shackle posts 24, positioned outwardly beyond the sides of the truck frame. The front and rear face of each shackle post 24 is provided with a hanger 25 in which a depending shackle is pivotally hung. The lower ends of the shackles are pivotally connected to eyes at the ends of the springs 21 and 22. The shackle posts 24 are relatively tall, and the shackles 26 are relatively long so that they may swing in their hangers through a considerable transverse distance with little change in elevation of their lower ends. I have found it satisfactory, for example, to employ shackles of a length of about 6 inches between pivot centers in an assembly in which axial movement of the tandem axle was limited to about two inches in each direction from its normal position. Desirably, in normal position with the springs under minimum load, the shackles are inclined slightly outwardly from their spring connections upward, for example as indicated in Fig. 3.

A pair of tie rods 30 are pivotally connected to the tandem axle 20 adjacent its ends, by connections which permit some universal movement. Such mounting is desirably on a parallel axis below the tandem axle 20. Preferably, each tie rod 30 carries a transverse hub 31 mounted by means of a rubber bushing on a pivot pin supported by a pair of lugs 32 depending from the axle 20. The two tie rods extend forward with some convergence so that their forward ends are spaced closer together than their rear ends. Their forward ends desirably carry hubs 31 similar to those at their rear ends, with similar rubber bushings.

This tandem axle assembly is connected to the truck essentially at three main points. A cylindrical spring support 35 is mounted between the frame cross members 11 and 13 on the longitudinal center line of the frame, and fixed to the frame in any desired manner, conveniently by welding its ends to the cross members. Spring pads 36 are secured on this support 35, either in fixed angular position or for rotation thereon in accordance with whether or not it is desired to have the tandem axle resist sway of the frame. The springs 21 and 22 are secured respectively to the pads 36. This connection of the springs to the frame comprises one of the three main points of connection between the tandem axle assembly and the truck.

The other two points of connection are at the front ends of the tie rods 30, which are pivotally attached to the truck axle at points spaced longitudinally thereof. Desirably, these attachments are to pivot pins positioned behind the truck axle and carried between lugs 37 mounted thereon, conveniently by welding. As has been pointed out, the mounting hubs 31 at the front ends of the tie rods 30 are lined with rubber bushings, which permit limited universal movement of the pivot joints.

The tandem axle arrangements embodying my invention, as exemplified above, provide many advantages in a relatively simple and inexpensive assembly, which is adapted for use either as original equipment or for ready modification of a standard truck. In operation, the trailing axle position behind the leading axle is controlled by the tie rods. However, the tie rods are connected to the trailing axle on a common pivot line spaced below its axis and the relative position of such axis with respect to such pivot line is yieldingly fixed by the resistance which the transverse springs exert against rotation of the axle about the pivot line. The spacing between the axles is hence not a rigidly fixed spacing, but one in which some resilient change may take place, to dissipate road shocks which otherwise would be transmitted directly to the driving axle.

The same off center pivoting of the tie rods to the trailing axle conveniently gives the tie rods an inclination which during vertical movements of the axle causes slight forward and rearward movements acting in known manner to avoid shocks on the running gear. Such inclination will ordinarily approach parallelism with the corresponding radius of movement of the power axle about its forward spring hanger, and hence minimize shocks on, or displacement of each axle in consequence of movements of the other.

The angularity of the tie rods in plan gives a self steering action to the trailing axle. Referring to Fig. 1, if the truck travels forward into a turn to the left, road reaction on the wheels of the trailing axle moves such axle to the left, toward the inside of the turn; this swings the left-hand tie rod to the left to shorten the distance between the left-hand pair of wheels while the right-hand tie rod swings in the same direction to lengthen the distance between the right-hand pair of wheels; and this turns the trailing axle toward a position of intersection between the axes of the two axles at the center of the turn. The lateral movement of the trailing axle for this purpose is substantially a floating movement, without restraint, since the long shackles swing through the necessary arc without material change in elevation of their swinging ends and hence substantially without load-lifting effect. Such free lateral movement of the trailing axle not only effects the self-steering action to avoid tire scuffing, but itself avoids tire scuffing by preventing the turning movement from dragging the tires transverse to the line of travel.

I claim as my invention:

1. In a truck having a frame and a power axle with suspension means and driving means therebetween, a tandem axle construction comprising a tandem axle behind said power axle, upstanding shackle posts adjacent the ends of said tandem axle, a central spring support on said frame, a pair of transverse springs secured to said support on opposite sides of said axle, shackles between the ends of said springs and said shackle posts, a pair of tie rods respectively connected to said tandem axle adjacent its ends and below said axle, said tie rods extending forwardly and upwardly and being pivotally connected at their forward ends to said power axle at points spaced longitudinally thereof, said tie-rod connections providing limited universal movement and said spring shackles being relatively long whereby said tandem axle has substantial freedom of movement laterally of said frame and with respect to said power axle, said tie rods having their forward ends spaced apart a shorter distance than their rearward ends whereby during lateral movement said tandem axle is angularly displaced and steered to follow said power axle.

2. In a truck having a frame and a rear axle, a tandem axle behind said truck axle, a central spring support secured to said frame and above said tandem axle, a pair of pivot connections secured to said truck axle at points spaced longitudinally thereof, a pair of tie-rods respectively connected to said pivot connections for limited universal movement and extending rearwardly and with divergence to points of connection adjacent the ends of said tandem axle, a pair of transverse springs mounted on said spring support on opposite sides of said tandem axle, and means adjacent the ends of said tandem axle for supporting said springs and arranged to permit limited movement of said tandem axle laterally of said frame.

3. In a truck having a frame and a rear axle, a tandem axle behind said truck axle, a pair of pivot connections secured to said truck axle at points spaced longitudinally thereof, a pair of tie-rods respectively connected to said pivot connections for limited universal movement and extending rearwardly and with divergence to points of connection adjacent the ends of said tandem axle, an extension frame secured to the rear of said truck frame, a pair of longitudinally spaced cross members on said combined frame respectively ahead and behind said tandem axle, a spring support extending longitudinally at the center of said frame between said cross members, a pair of transverse springs pivotally mounted on said spring support on opposite sides of said tandem axle, and means adjacent the ends of said tandem axle for supporting said springs and arranged to permit free movement of said tandem axle laterally of said frame and with respect to said truck axle.

4. A tandem axle assembly for a truck having an axle and a frame supported thereon, said assembly comprising a tandem axle, a pair of springs parallel therewith on opposite sides thereof, spring supports adjacent the ends of said tandem axle which permit limited longitudinal movement of the axle with respect to the springs, a pair of tie rods pivoted to said tandem axle adjacent its ends and extending forwardly and inwardly, means for supporting said truck frame centrally on said springs, and means to connect the forward ends of said tie rods to the truck axle at points spaced a distance less than the spacing of their rear ends, the connections of said tie rods to said tandem axle and the means for connecting said tie rods to the truck axle providing limited universal movement therebetween.

RALPH A. WOODS.

REFERENCES CITED

The following references are of record in the file of this patent:

UNITED STATES PATENTS

| Number | Name | Date |
| --- | --- | --- |
| 1,861,111 | Cason | May 31, 1932 |
| 1,871,735 | Prins | Aug. 16, 1932 |
| 2,112,112 | Porsche | Mar. 22, 1938 |
| 2,364,842 | Feigelson | Dec. 12, 1944 |